(12) United States Patent
Butler

(10) Patent No.: US 12,513,236 B2
(45) Date of Patent: Dec. 30, 2025

(54) TWO-WAY COMMUNICATION SYSTEM INITIATED BY MACHINE READABLE CODE

(71) Applicant: BearCom Group, Inc., Garland, TX (US)

(72) Inventor: Michael Butler, Arlington, TX (US)

(73) Assignee: BEARCOM GROUP INC., Garland, TX (US)

( * ) Notice: Subject to any disclaimer, the term of this patent is extended or adjusted under 35 U.S.C. 154(b) by 407 days.

(21) Appl. No.: 18/203,939

(22) Filed: May 31, 2023

(65) Prior Publication Data

US 2023/0412722 A1 Dec. 21, 2023

Related U.S. Application Data

(60) Provisional application No. 63/354,172, filed on Jun. 21, 2022.

(51) Int. Cl.
*H04M 1/72436* (2021.01)
*H04M 1/2755* (2006.01)
*H04M 1/72469* (2021.01)

(52) U.S. Cl.
CPC ..... *H04M 1/72436* (2021.01); *H04M 1/2755* (2013.01); *H04M 1/72469* (2021.01)

(58) Field of Classification Search
CPC ........... H04M 1/72436; H04M 1/2755; H04M 1/72469; H04M 1/72412
See application file for complete search history.

(56) References Cited

U.S. PATENT DOCUMENTS

| 10,026,099 | B1 * | 7/2018 | Joshi | G06Q 30/0261 |
| 2017/0311367 | A1 * | 10/2017 | Ursitti | H04W 48/04 |
| 2021/0174354 | A1 * | 6/2021 | Foster, Jr. | G06Q 20/383 |
| 2023/0367441 | A1 * | 11/2023 | Gao | G06F 3/1454 |

* cited by examiner

*Primary Examiner* — Farid Seyedvosoghi
(74) *Attorney, Agent, or Firm* — Jeff Mangels; Butler & Mitchell LLP; Brennan C. Swain, Esq.

(57) ABSTRACT

A system for providing communication between a first electronic device and a second electronic device that includes a server, a first software application executable on the first electronic device in communication with the server, a second software application executable on the second electronic device in communication with the server, and a first display that includes a first machine readable code thereon. When the first machine readable code is processed by the first electronic device a first user interface is displayed on the first electronic device and a second user interface is displayed on the second electronic device. The first user interface includes a first predetermined input and selection of the first predetermined input prompts an initial indicator on the second electronic device.

9 Claims, 5 Drawing Sheets

TWO-WAY COMMUNICATION SYSTEM INITIATED BY MACHINE READABLE CODE

CROSS-REFERENCE TO RELATED APPLICATIONS

This application claims the benefit of U.S. Provisional Application No. 63/354,172, filed on Jun. 21, 2022, the entirety of which is incorporated by reference herein.

FIELD OF THE INVENTION

The present invention relates generally to communication systems, and more particularly to a system that provides two communication between electronic devices after the initial scanning of a machine readable code.

BACKGROUND OF THE INVENTION

Telephone call boxes, or call boxes, are conventional tools of telecommunication for a user to contact another person, such as a dispatch officer, an employee, or a designated personnel. Call boxes may be located in remote places or where there is considerable distance between two parties or two locations between where communication is desired. However, call boxes generally only allow for voice communication and are fixed to their respective locations. As such, there is a need for improved call box systems that provide flexibility of wireless and versatile methods of communication.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention, there is provided a system for providing communication between a first electronic device and a second electronic device. The system includes a server, a first software application executable on the first electronic device in communication with the server, a second software application executable on the second electronic device in communication with the server, and a first display that includes a first machine readable code thereon. When the first machine readable code is processed by the first electronic device a first user interface is displayed on the first electronic device and a second user interface is displayed on the second electronic device. The first user interface includes a first predetermined input and selection of the first predetermined input prompts an initial indicator on the second electronic device. The initial indicator may be the change of an indicator member associated with the first user interface from a non-indication state to an indication state. The initial indicator may also be a haptic indicator (vibration) or an audible indicator or any and all of these types of indicators.

The first user interface may include a first user interface variable input (e.g., text box) configured to transmit a user variable message to be displayed on the second user interface. The second user interface may include at least a first predetermined input and selection of the first predetermined input may prompt a first predetermined message to be displayed on the first user interface. The second user interface may include a second user interface variable input (e.g., text box) configured to transmit a responder variable message to be displayed on the first user interface. The second user interface may include a second predetermined input, and selection of the second predetermined input may prompt a second predetermined message to be displayed on the first user interface.

The system may include a second display that includes a second machine readable code thereon (e.g., a second kiosk with a QR code on the display). When the second machine readable code is processed by the first electronic device a third user interface is displayed on the first electronic device. The third user interface is different than the first user interface. In other words, when processed or scanned, the second QR code may cause a different user interface to be displayed on the first electronic device. The different UI may be as simple as stating "Kiosk two" as opposed to "Kiosk one." The second electronic device also may receive information regarding which kiosk or display has had its machine readable code scanned.

In accordance with another aspect of the present invention there is provided a computer-implemented method of providing a communication between a first electronic device and a second electronic device. The method includes scanning and processing a machine readable code using the first electronic device, such that a first user interface is displayed on the first electronic device and a second user interface is displayed on the second electronic device. Selecting a first predetermined input on the first user interface, whereby selection of the first predetermined input prompts an initial indicator on the second electronic device. The present invention may also include a computer-readable, non-transitory medium including instructions that, when executed by a first electronic device in cooperation with a server, enables connection of the first electronic device with a second electronic device.

Barcode virtual call box communication systems. A system includes a transmitting user interface configured to prompt an input from a transmitting user. The system further includes a barcode configured to provide the transmitting user interface on a medium. The system further includes a receiving user interface configured to present the input to a receiving user and receive a second input from the receiving user for the transmitting user interface to present to the transmitting user. U.S. Patent Publ. No. 2017/0311367 includes description related to communication between two mobile devices and is incorporated by reference herein in its entirety.

BRIEF DESCRIPTION OF THE DRAWINGS

The disclosure may be more readily understood by referring to the accompanying drawings in which.

DETAILED DESCRIPTION OF THE PREFERRED EMBODIMENTS

Figure 1:
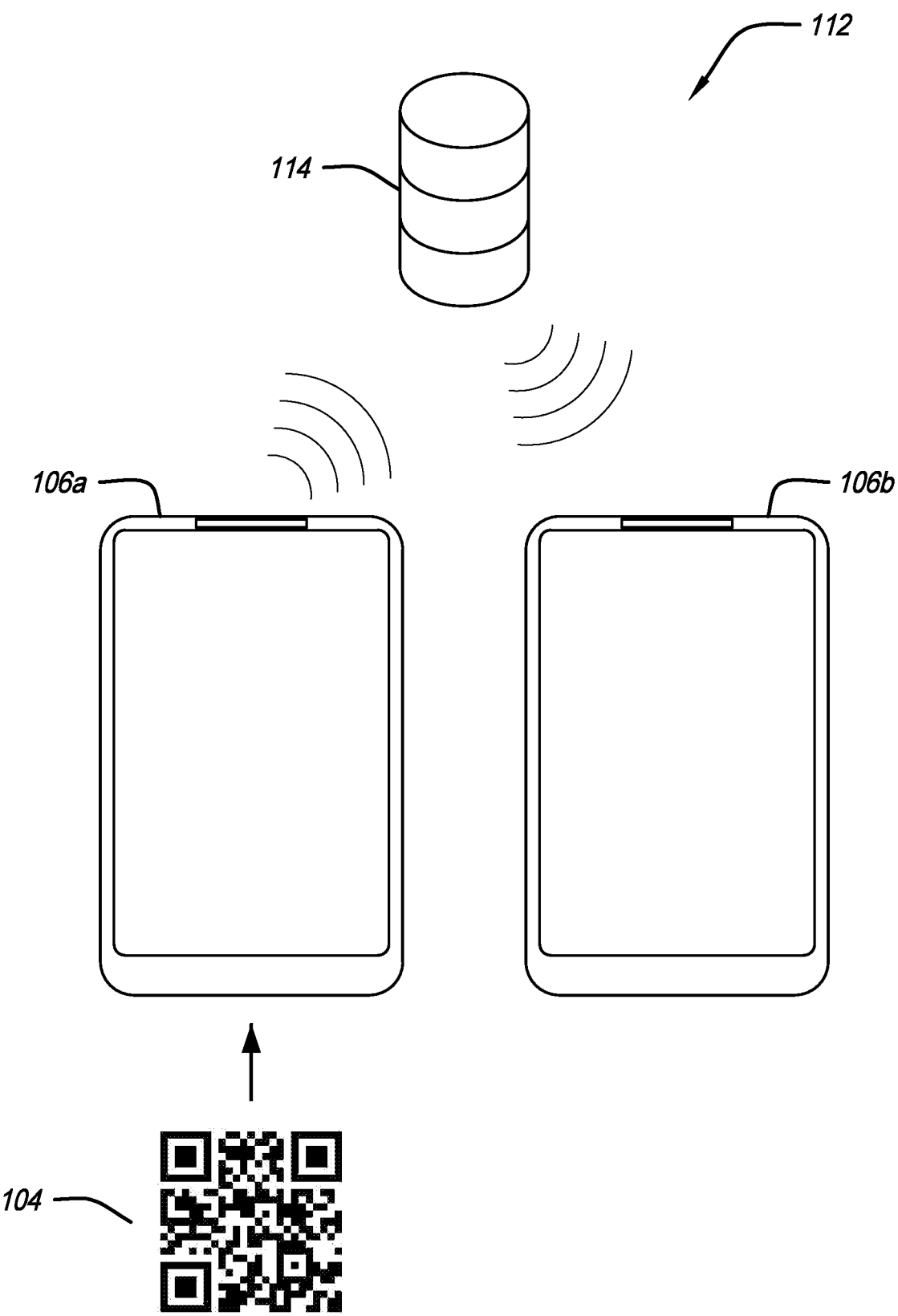
FIG. 1 shows a schematic of a communication system in accordance with a preferred embodiment of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). The various components of the present invention, are stored or recorded on a hard disk or other like storage devices described above, which may be accessed and utilized by a web browser, mobile app, the server (over the network), or any of the peripheral devices described herein.

One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C #, Java, Cobol, assembler, PERL, Python, PHP, or the like, or macros using Excel or other similar or related applications with various algorithms being implemented with any combination of data structures, objects, processes, routines or other programming elements.

Referring now to the drawings, which are for purposes of illustrating the present invention and not for purposes of limiting the same, the drawings show a wireless communication system in which two-way radio or wireless communication systems are integrated with networked applications and possibly voice recognition systems. The FIGS. 1-8 are directed to systems of communication. A system may include a barcode or other machine readable code, which may be a quick response (QR) code. The barcode may be read, scanned, or captured by an electronic device. The barcode may then be processed and provide a transmitting or first user interface on the first electronic device. For example, a user may scan the QR code with the camera on their mobile phone or computer (e.g., the first electronic device), which causes a transmitting or first user interface to appear or be displayed on their screen. The transmitting user interface may be specific to or associated with the barcode as well as a unique communication channel. The transmitting user interface may prompt an input from a transmitting user (e.g., the user that scanned the QR code) or include a number of predetermined or preselected input choices. The input may be a voice, text, video, graphic, or haptic message by example. The electronic device may transmit the input to a second electronic device through wireless communication.

The second electronic device may provide a receiving or second user interface. The first and/or second user interface may be associated with a mobile software application or "app" that runs on either of the first and second user's electronic device, such as a smart phone, tablet, computer or the like. The software application may be a software application dedicated to the communication system (an "app" for the communication system) or may be an internet web browser, such as Chrome, Safari, etc. For example, when the barcode is scanned, the first user interface may appear or be displayed via the internet web browser on the first electronic device and via a dedicated app on the second electronic device. Either of these are referred to herein as a software application. The system includes a first software application executable on the first electronic device in communication with the server and a second software application executable on the second electronic device in communication with the server. The receiving or second user interface may be specific to or associated with the barcode as well as the unique communication channel. The receiving user interface may present the input to a receiving user. The receiving user may then enter a second input through the receiving user interface. The second input may be transmitted to the first electronic device through wireless communication. The second input may then be presented on the transmitting user interface. As such, the systems described herein may advantageously enable communication in locations where a person needs help, such as in a store (e.g., for customer service), a park, a remote location (e.g., for emergency help), and the like.

FIG. 1 shows a schematic of a communication system 112 that may be used in the present invention. The system 112 may include the first electronic device 106a, the second electronic device 106b, a QR code 104, and a remote server 114. The QR code is only exemplary and any machine readable code is within the scope of the present invention.

Figure 2:
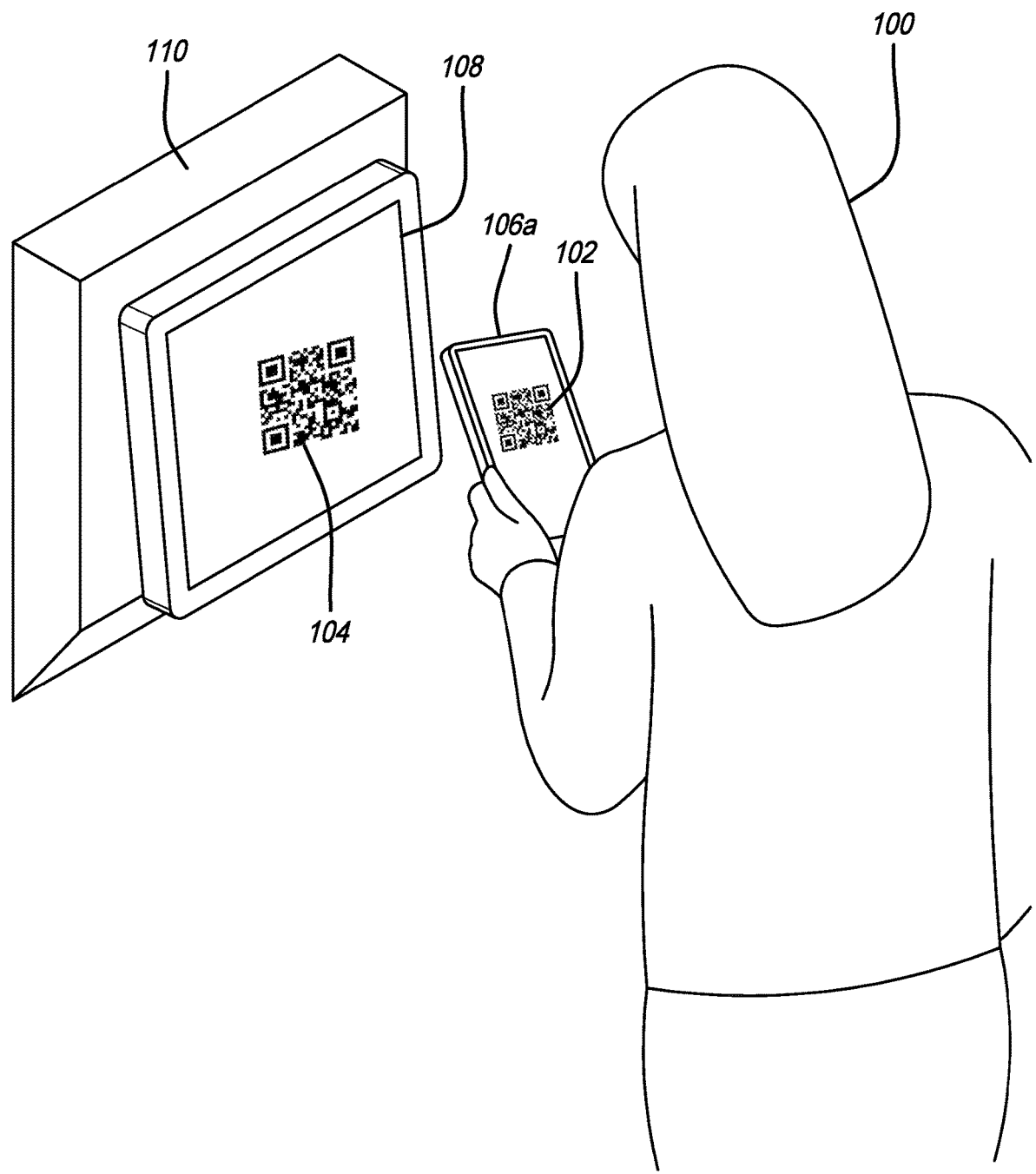
FIG. 2 shows a user capturing an image of a QR code via an electronic device in accordance with a preferred embodiment of the present disclosure.

FIG. 2 shows a user 100 capturing an image 102 of a QR code 104 via the user or first electronic device 106a or electronic display. For example, the QR code 104 (see FIG. 2) may be displayed on a display 108 of a kiosk 110, which may be an electronic or non-electronic display. The QR code 104 may be displayed on any type of display or monitor, such as on a wall, stand, post, mobile platform or device. In some examples, the QR code 104 may be printed on a medium (e.g., a non-electronic medium, such as paper, metal, wood, plastic or the like). For example, the QR code 104 may be printed on a sign, placard or the like that is posted at a location. In some examples, the display 108 may be a display of another electronic device, which may be portable, stationary or fixed, such as a mobile phone, tablet or the like. In some examples, the QR code 104 may be another linear or matrix barcode.

The user or first electronic device 106a may be a portable electronic device, such as a smartphone, a tablet, a multimedia player, smart glasses, etc. The user electronic device 106a may have or include a camera, a scanner, a barcode reader, and/or the like to capture, scan, or read the QR code 104.

Once the QR code 104 is captured, scanned, or read, the QR code 104 may be processed by a native processor of the electronic device 106a or a processor of the server 114 communicating with the electronic device 106a. The processing of the QR code 104 preferably provides a transmitting or first user interface 116 (see FIG. 3) on the first electronic device 106a or another medium in communication with the electronic device 106a. The transmitting user interface 116 may prompt one or more inputs (e.g., first, second, third inputs, etc.) from the first user 100. The input may be visual, auditory, or haptic. For example, the input may be one or more of a "pressable" or selectable button (part of the first UI), text message, a voice message, a voice call, a video call, a vibration, a ping, an image, and/or the like. The electronic device 106a may communicate the input, or a message or indicator associated with the input, to the second electronic device 106b directly via conventional wireless communication methods (e.g., Bluetooth®, Infrared, Zigbee®) or indirectly via the server 114 (e.g., via the internet, satellite or other wireless communication).

To aid in understanding, the exemplary use of the present invention is a user shopping in a store that needs help (the first user) and where the user is helped by an employee of the store (the second user). The shopper scans the QR code 104 that is displayed 108 on a kiosk 110 associated with the "paint" area of the store. This example is not intended to be limiting.

FIG. 2 shows an exemplary QR code 104. Modules of the QR code 104 may be presented in different arrangements. Each different QR code 104 may be for a different communication channel and/or, e.g., associated with a different kiosk (e.g., in a different area of the store). A different communication channel may simply be a different web address. The user interface and/or the receiving device may vary based on the QR code 104 and the information associated therewith. For example, a first QR code 104 may connect the user 100 to a store clerk and a second QR code 104 may connect the user 100 to a store manager.

Figure 4:
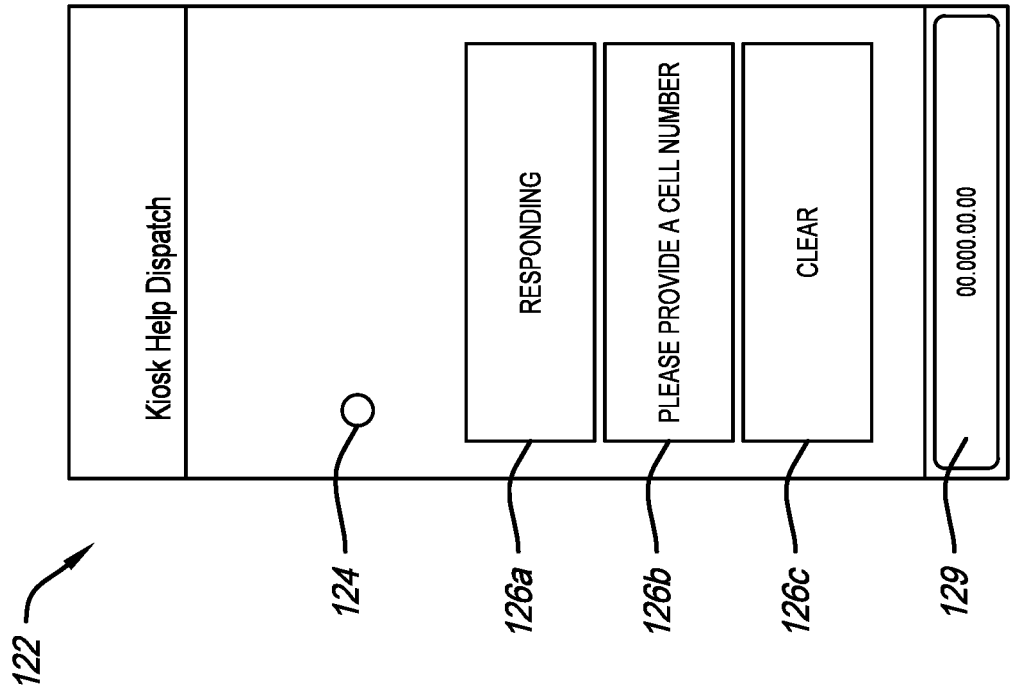
FIG. 4 shows an exemplary second user interface of the communication system in accordance with a preferred embodiment of the present disclosure.
Figure 3:
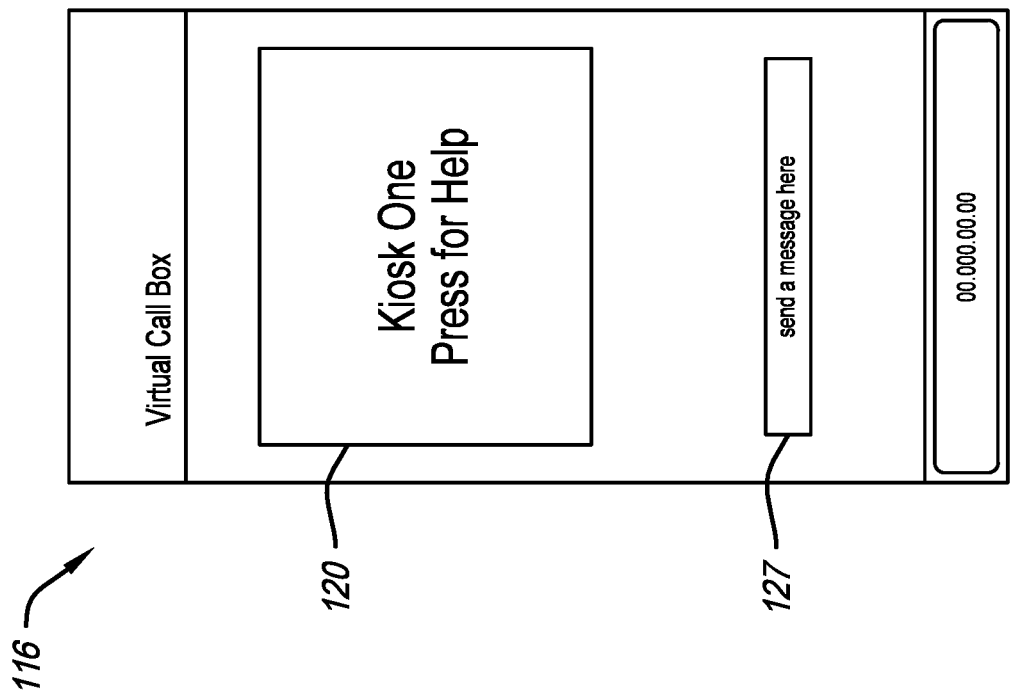
FIG. 3 shows an exemplary first user interface of the communication system in accordance with a preferred embodiment of the present disclosure.

FIG. 3 shows an exemplary transmitting or first user interface 116 (e.g., the user interface that is displayed on the shopper's phone or mobile electronic device after scanning the QR code). The first user interface 116 includes at least a first predetermined input, e.g., button 120, and a first user interface variable input, e.g., text box 127. FIG. 4 shows an exemplary receiving or second user interface 122 (e.g., the user interface that is displayed on the employee's phone or mobile electronic device). FIG. 4 includes first, second and third predetermined inputs, first and second message buttons 126a and 126b and clear message button 126c, and a second user interface variable input, text box 128 (see FIG. 6). The receiving user interface 122 may be displayed or presented on the second electronic device 106b. The transmitting user interface 116 may identify the communication channel. For example, button 120 of the transmitting user interface 116 recites "Kiosk One Press for Help." If the QR Code for a different kiosk is scanned, button 120 may recite "Kiosk Two." By "pressing" this button or touching this area of the screen or GUI, the transmitting user interface 116 may alert, send a message to, otherwise prompt or provide an initial indicator to the second electronic device 106b (the employee's mobile device). The initial indicator may be one or more of an indicator 124, as described below, an audible indicator or message, a haptic indicator or message or some or all of these.

Figure 5:
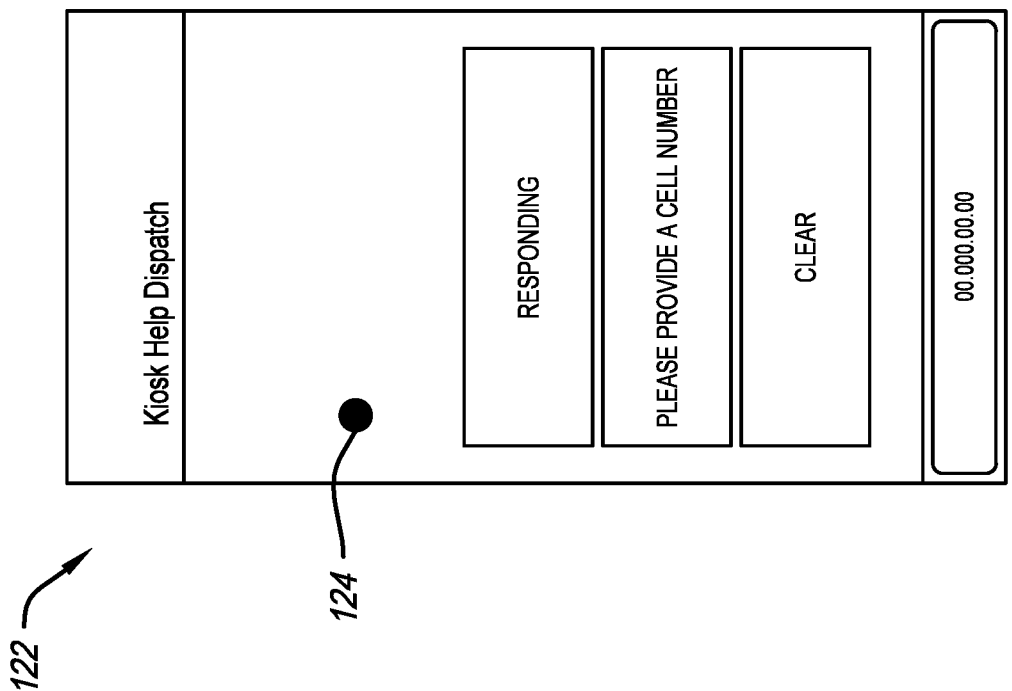
FIG. 5 shows the exemplary second user interface with the indicator in an indication mode.

The receiving or second user interface 122 may include an indicator member 124 or light. The indicator member 124 may, as an initial indicator, indicate or change from a non-indication state to an indication state (i.e., change color, light up, etc.) after box 120 has been "pressed." For example, FIG. 5 shows the indicator member 124 has lit up or turned red or otherwise changed color or brightness after the user has actuated box 106 (see the radially extending lines around indicator member 124 in FIG. 5 showing the indication state). This alerts the employee that a shopper needs help. A message (another type of initial indicator) can also appear or be displayed letting the employee know which kiosk 110 or display 108 had its QR code scanned. In this case, kiosk one, which is in the paint section of the store. An audible indicator via the second electronic device (e.g., "help needed at kiosk one" or "help needed in paint") and/or a haptic indicator can also alert the employee or person with the second electronic device 106b.

Figure 7:
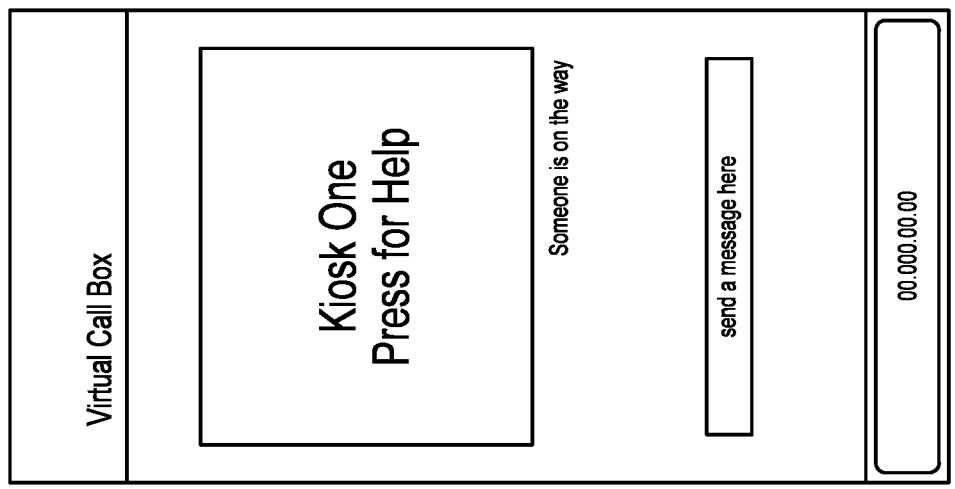
FIG. 7 shows the exemplary first user interface with a received predetermined message in the message receipt box.

As shown in FIG. 7, the first user interface 116 may also display or present a message sent from the second electronic device 106b. The second user interface 122 may display or present one or more predetermined prompts or preselected messages as a response to the user 100. The prompts (see first message button 126a and second message button 126b) may include "responding," or "please provide a cell number." "Responding" may indicate that a physical or virtual response to the user 100 is in progress. "Please provide a cell number" may be a request for a cell phone number of the user as an alternate means of communication. For example, the transmitting user interface 116 may display the text message "Someone is on the way", as a result of the second user "pressing" or activating the "responding" button (referred to herein as a first message button 126a) on the second user interface 122. As shown in FIG. 4, the second user interface 122 may also include a second message button 126b that when pressed causes "please provide a cell number" to appear or be displayed on the first user interface 116. The first user can respond with a cell number (or any other message) via the text box 127 shown in FIG. 3. The first user interface 116 may further identify the user of the second electronic device 106b. For example, the first user interface 116 may display that the message is from "Dispatch".

Figure 6:
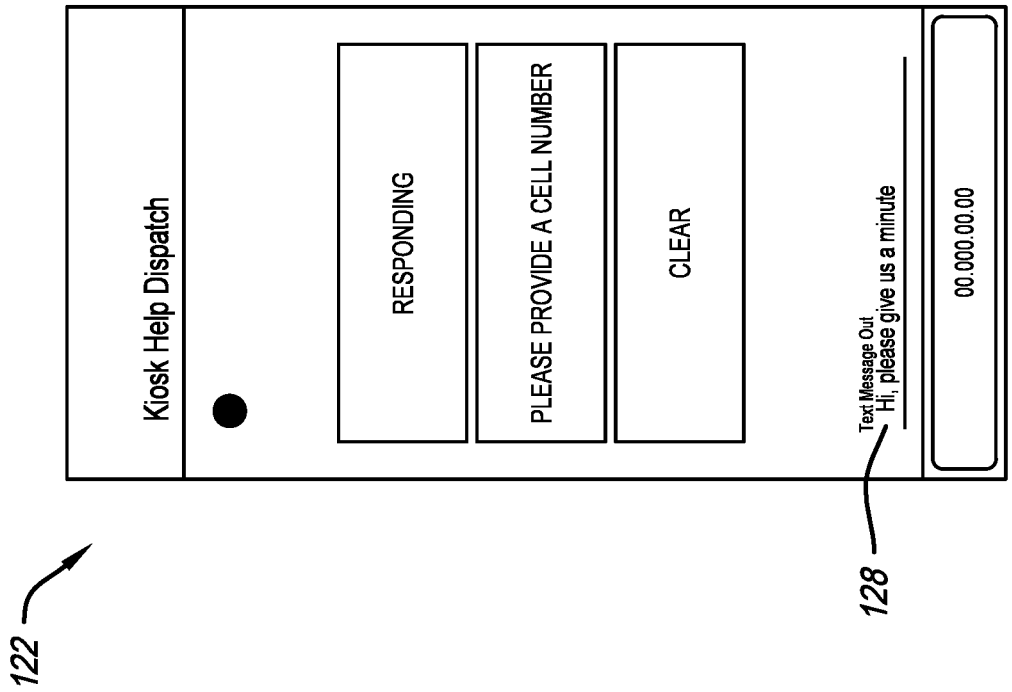
FIG. 6 shows the exemplary second user interface with a message input into the text area.
Figure 8:
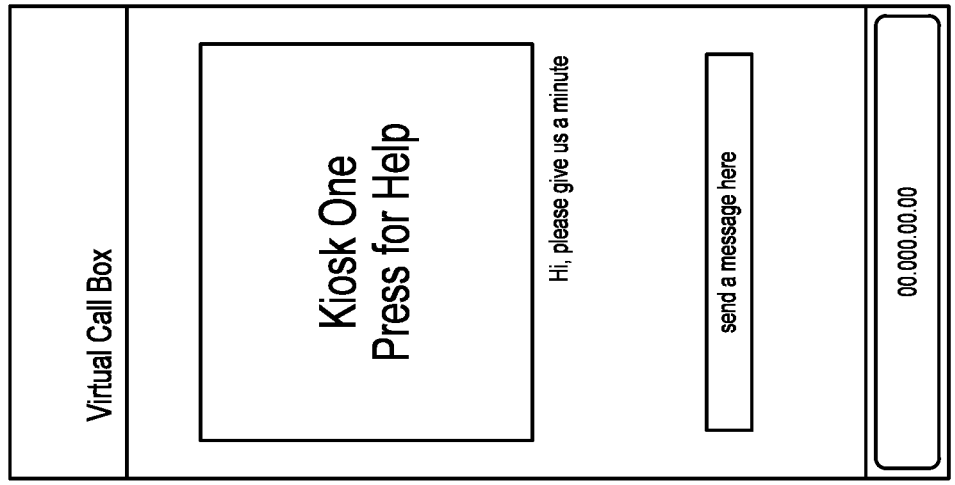
FIG. 8 shows the exemplary first user interface with a received prepared message in the message receipt box.

As shown in FIG. 6, the receiving or second user interface 122 may also include a text line, text box or area 128 in which the second user or employee may type or enter text messages to send to the first electronic device 106a and first user interface 116. For example, in FIG. 6, the employee has typed "Hi, please give us a minute" into the text box 128 in the second user interface 122, and, as shown in FIG. 8, this message was received on the first user interface 116 on the first electronic device 106b in the message receipt box 131. The "clear" may mean that when pushed, the previous predetermined prompts sent by the dispatcher as a response to the user and displayed on the user's screen will be deleted. One or more of the prompts 126 may be selected via user input on the electronic device 106b to be sent to the electronic device 106a.

As shown in FIG. 4, the second user interface 122 may also include a clear message button 126c that when pressed causes any previously sent messages (whether via the text box 128 or via pressing first or second message button 126a and 126b) to disappear or be deleted from the first user interface 116. Therefore, the two users can communicate via text messages that they create (through variable inputs or text boxes 127 and 128) or by pressing buttons with a predetermined or preselected message associated therewith, such as call box 120 on the first user interface 116, which initiates the interaction, or the first and second message buttons. Any predetermined message can be associated with the first and second message buttons. Also, any number of predetermined message buttons can be included. Box 129 in the figures (see, e.g., FIG. 4) is the box where the web address appears or is displayed after the user has scanned and activated the QR Code. Each prompt or message sent back and forth between the users can also be audible in case the user is not looking at their phone. A haptic notification can also be included. For example, when the "responding" first message button 126 is pressed, the message "someone is on the way" may appear, display or be displayed, as shown in FIG. 7, but the first electronic device may also vibrate, alerting the first user.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears or is displayed in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for providing communication between a first electronic device and a second electronic device, the system comprising:
    a server,
    a first software application executable on the first electronic device in communication with the server,
    a second software application executable on the second electronic device in communication with the server,
    a first display that includes a first machine readable code thereon,
    wherein when the first machine readable code is processed by the first electronic device a first user interface is displayed on the first electronic device and a second user interface is displayed on the second electronic device, wherein the first user interface includes a first predetermined input, wherein selection of the first predetermined input prompts an initial indicator on the second electronic device.

2. The system of claim 1, wherein the initial indicator is the change of an indicator member associated with the first user interface from a non-indication state to an indication state.

3. The system of claim 1, wherein the first user interface includes a first user interface variable input configured to transmit a user variable message to be displayed on the second user interface.

4. The system of claim 1, wherein the second user interface includes at least a first predetermined input, wherein selection of the first predetermined input prompts a first predetermined message to be displayed on the first user interface.

5. The system of claim 4, wherein the second user interface includes a second user interface variable input configured to transmit a responder variable message to be displayed on the first user interface.

6. The system of claim 5, wherein the second user interface includes a second predetermined input, wherein selection of the second predetermined input prompts a second predetermined message to be displayed on the first user interface.

7. The system of claim 1, further comprising a second display that includes a second machine readable code thereon, wherein when the second machine readable code is processed by the first electronic device a third user interface is displayed on the first electronic device, wherein the third user interface is different than the first user interface.

8. A system for providing communication between first and second electronic devices, the system comprising:
    a server, a first software application executable on the first electronic device in communication with the server, a second software application executable on the second electronic device in communication with the server, a first display that includes a first machine readable code thereon, wherein when the first machine readable code is processed by the first electronic device a first user interface is displayed on the first electronic device and a second user interface is displayed on the second electronic device, wherein the first user interface includes a first predetermined input, wherein selection of the first predetermined input prompts an initial indicator on the second electronic device, wherein the initial indicator is the change of an indicator member associated with the first user interface from a non-indication state to an indication state, wherein the first user interface includes a first user interface variable input configured to transmit a user variable message to be displayed on the second user interface, wherein the second user interface includes at least a first predetermined input, wherein selection of the first predetermined input prompts a first predetermined message to be displayed on the first user interface, wherein the second user interface includes a second user interface variable input configured to transmit a responder variable message to be displayed on the first user interface.

9. The system of claim 8, wherein the second user interface includes a second predetermined input, wherein selection of the second predetermined input prompts a second predetermined message to be displayed on the first user interface.

\* \* \* \* \*